United States Patent
Foltin et al.

(10) Patent No.: US 9,764,681 B2
(45) Date of Patent: Sep. 19, 2017

(54) METHOD AND DEVICE FOR GROUPING ILLUMINATION UNITS

(75) Inventors: Johannes Foltin, Ditzingen (DE); Sebastian Van Staa, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 175 days.

(21) Appl. No.: 14/356,308

(22) PCT Filed: Sep. 3, 2012

(86) PCT No.: PCT/EP2012/067063
§ 371 (c)(1),
(2), (4) Date: Aug. 5, 2014

(87) PCT Pub. No.: WO2013/064283
PCT Pub. Date: May 10, 2013

(65) Prior Publication Data
US 2014/0369058 A1    Dec. 18, 2014

(30) Foreign Application Priority Data
Nov. 3, 2011    (DE) .......................... 10 2011 085 689

(51) Int. Cl.
*B60R 22/00*    (2006.01)
*B60Q 1/02*    (2006.01)
(Continued)

(52) U.S. Cl.
CPC .............. *B60Q 1/14* (2013.01); *B60Q 1/085* (2013.01); *G06K 9/00825* (2013.01); *B60Q 2300/3321* (2013.01)

(58) Field of Classification Search
USPC ................................................ 701/49; 315/82
See application file for complete search history.

(56) References Cited

U.S. PATENT DOCUMENTS

| 7,565,006 | B2 * | 7/2009 | Stam | ...................... B60Q 1/085 315/82 |
| 2004/0143380 | A1 * | 7/2004 | Stam | ...................... B60Q 1/085 701/36 |

(Continued)

FOREIGN PATENT DOCUMENTS

| CN | 101184145 A | 5/2008 |
| DE | 102005017933 | 10/2006 |

(Continued)

OTHER PUBLICATIONS

International Search Report for PCT/EP2012/067063, issued on Jan. 7, 2013.

*Primary Examiner* — Tyler Paige
(74) *Attorney, Agent, or Firm* — Norton Rose Fulbright US LLP; Gerard Messina (57) ABSTRACT

A method is described for ascertaining a group of at least two adjacently situated illumination units during the travel of a vehicle. The method includes a step of recognizing at least one first illumination unit and at least one second illumination unit in a detection range of a sensor and recognizing a subsequent departure of the first illumination unit from the detection range of the sensor. The method also includes a step of detecting a distance and/or a time which the vehicle travels after a departure of the first illumination unit from the detection range of the sensor up to a departure of the second illumination unit from the detection range of the sensor.

11 Claims, 4 Drawing Sheets

(51) Int. Cl.
*B60Q 1/14* (2006.01)
*B60Q 1/08* (2006.01)
*G06K 9/00* (2006.01)

(56) References Cited

U.S. PATENT DOCUMENTS

| | | | |
|---|---|---|---|
| 2004/0201483 A1 | 10/2004 | Stam et al. | |
| 2008/0043099 A1 | 2/2008 | Stein et al. | |
| 2011/0210666 A1* | 9/2011 | Shiao | B60Q 1/085 315/82 |
| 2011/0210667 A1* | 9/2011 | Shiao | B60Q 1/076 315/82 |
| 2012/0062123 A1* | 3/2012 | Jarrell | H05B 37/0245 315/131 |
| 2012/0203432 A1* | 8/2012 | Lukacs | B60Q 1/0041 701/42 |
| 2013/0101157 A1* | 4/2013 | Li | G06K 9/00805 382/103 |
| 2014/0152826 A1* | 6/2014 | Liken | H04N 7/183 348/148 |

FOREIGN PATENT DOCUMENTS

| | | |
|---|---|---|
| DE | 102009034224 | 4/2010 |
| DE | 102009028342 | 2/2011 |
| EP | 1837803 | 9/2007 |
| WO | WO2011/015625 | 2/2011 |

\* cited by examiner

METHOD AND DEVICE FOR GROUPING ILLUMINATION UNITS

FIELD OF THE INVENTION

The present invention relates to a method for ascertaining a group of at least two adjacently situated illumination units during the travel of a vehicle, a corresponding device, and a corresponding computer program product.

BACKGROUND INFORMATION

The recognition of continuous roadway illumination, also referred to below as "city recognition," is essential for the development of high-beam assistants. With (adaptive) high-beam assistants the headlights must not be turned up when there is continuous roadway illumination. Accordingly, illuminated roadways in suburban areas must also be recognized. Instead of "recognition of continuous roadway illumination," for simplification the term "city recognition" is used. Such city light recognition is disclosed in German Published Patent Appln. No. 10 2009 028 342. German Published Patent Appln. No. 10 2009 028 342 describes a method for determining whether an area is illuminated. The method evaluates image data of a camera. The area is assessed as illuminated if at least two stationary roadway illumination units are recognized based on the image data, and these roadway illumination units have a spatial distance from one another.

The basis of city recognition is the detection of multiple streetlights within a certain distance. As soon as at least two streetlights have been recognized for a certain time (distance), a "city signal" is generated and the headlights are turned down. Switching over too early into the city mode (i.e., dimming the light or lowering the light cone or light emission range in the direction of the roadway) is prevented by evaluating the vertical position (detection angle) of the streetlight in the image.

In contrast, the headlights are not automatically turned down at crosswalks and illuminated intersections.

SUMMARY

Against this background, the present invention presents a method for ascertaining a group of at least two adjacently situated illumination units during the travel of a vehicle, as well as a device which uses this method, and lastly, a corresponding computer program product.

The present invention provides a method for ascertaining a group of at least two adjacently situated illumination units during the travel of a vehicle, the method having the following steps:

recognizing at least one first illumination unit in a detection range of a sensor and recognizing a subsequent departure of the first illumination unit from the detection range of the sensor;

beginning a measurement of a distance which the vehicle travels after a departure of the first illumination unit from the detection range of the sensor, and/or beginning a measurement of a time during which the vehicle travels after a departure of the first illumination unit from the detection range of the sensor; and grouping the first illumination unit with a second illumination unit into the group of at least two adjacently situated illumination units when a measured distance up to a departure of the second illumination unit from the detection range of the sensor has a predetermined relationship with respect to a distance threshold value, and/or when a measured time up to a departure of the second illumination unit from the detection range of the sensor has a predetermined relationship with respect to a time threshold value, and/or not grouping the first illumination unit with a second illumination unit into the group of at least two adjacently situated illumination units when an instantaneously measured distance is greater than the distance threshold value and/or when an instantaneously measured time is greater than the time threshold value.

Moreover, the present invention provides a device which is designed to carry out or implement the steps of the method according to the present invention in appropriate units. In particular, such a device has units which are designed to each execute one step of the method. The object of the present invention may also be quickly and efficiently achieved by this embodiment variant of the present invention in the form of a device.

In the present context, a device may be understood to mean an electrical device which processes sensor signals and outputs control or data signals as a function thereof. The device may have an interface which may have a hardware and/or software design. In a hardware design, the interfaces may be part of a so-called system ASIC, for example, which contains various functions of the device. However, it is also possible for the interfaces to be dedicated, integrated circuits, or to be at least partially composed of discrete components. In a software design, the interfaces may be software modules which are present on a microcontroller, for example, in addition to other software modules.

Also advantageous is a computer program product having program code which may be stored on a machine-readable carrier such as a semiconductor memory, a hard drive, or an optical memory, and used for carrying out the method according to one of the above-described specific embodiments when the program is executed on a computer or a device.

An illumination unit may be considered to be a structural (infrastructure) measure or a structural object in the region of or at the edge of a roadway which actively emits light. For example, such an illumination unit may be a streetlight, an illuminated traffic sign, or a lamp of a traffic light system. A group of at least two adjacently situated illumination units may be understood to mean a cluster of two illumination units which are spatially situated close to one another. The illumination units may be situated or recognized, for example, at the edge of a roadway or above a roadway on which the vehicle is driving during travel. A sensor may be understood to mean, for example, an optical sensor such as a camera. A detection range may be understood to mean a range to be monitored by the sensor. A disappearance or departure of an illumination unit from the detection range may be understood to mean a departure of this illumination unit from the detection range of the sensor when the vehicle moves but the illumination unit does not, and the vehicle (with the sensor situated therein) thus travels past the illumination unit. A distance which the vehicle travels may be understood to mean, for example, a route (which is measured in meters or centimeters, for example). This route may be determined, for example, by evaluating images, recorded by the sensor, from which a travel speed of the vehicle and/or a distance covered by the vehicle may be deduced. Alternatively or additionally, for example, signals of the wheel speed sensors of the vehicle may be utilized to deduce the speed of the vehicle. The determination of the group of at least two adjacently situated illumination units may then take place in such a way that the first and second illumination units are associated with the group of at least two adjacently situated illumination units when the detected distance has a predetermined relationship with respect to a distance threshold value and/or when the detected time has a predetermined relationship with respect to a time threshold value. In particular, the detected distance may be less than a distance threshold value, or the detected time may be less than the time threshold value.

The present invention is based on the finding that individual illumination units which are recognized in the detection range of a sensor may now be grouped into a group of illumination units when a certain criterion is present. The present invention now offers the advantage that for a subsequent evaluation of the illumination units, this group of illumination units which are recognized in the detection range of the sensor provides more precise and detailed conclusions concerning the surroundings of the vehicle than the evaluation based solely on individual recognized illumination units, in particular with regard to a course of the roadway, or an assessment as to whether the vehicle at that moment is traveling on a roadway in an urban area or having continuous roadway illumination. It is not absolutely necessary for both streetlights to be visible in the image at the same time, and they may still be close to one another, for example when they are situated at a roadway intersection and one of them is concealed. There is advantageously no waiting until the second streetlight has disappeared from the detection range, when the distance traveled is already greater than the distance that is used for the grouping. As a result, a response may be made more quickly, and continuous roadway illumination may be recognized earlier.

According to another specific embodiment of the present invention, it is advantageous when in the step of grouping, the first and second illumination units are grouped into the group of at least two adjacently situated illumination units when the distance is less than the distance threshold value, and/or when in the step of grouping, the first and second illumination units are grouped into the group of at least two adjacently situated illumination units when the time is less than the time threshold value. Such a specific embodiment of the present invention offers the advantage that, by using the distance threshold value or the time threshold value, a very precise definition may be made concerning the distance after which the two illumination units are grouped with one another into the (same) group, and/or the (travel) time after which the two illumination units are grouped into the (same) group. An adjustment by the "spatial extent" of the group containing the illumination units in question may be made in this way. The threshold value used in the approach presented here may, for example, also be variable and/or adjusted during travel.

According to another advantageous specific embodiment of the present invention, in the step of grouping it is possible for the first and second illumination units to not be grouped into the group of at least two adjacently situated illumination units when the distance is greater than the distance threshold value, and/or in the step of grouping, it is possible for the first and second illumination units to not be grouped into the group of at least two adjacently situated illumination units when the time is greater than the time threshold value. Such a specific embodiment of the present invention offers the advantage that a clear criterion is present concerning the distance after which the distance between the first illumination unit and the second illumination unit which is to be traveled, and/or the (travel) time that elapses between the departure of the first illumination unit from the detection range of the sensor and the departure of the second illumination unit from the detection range of the sensor, according to which the at least two illumination units may no longer be grouped into a (shared) group. It may thus be ensured that in subsequent processing of an image from the sensor, both illumination units may also be considered as illumination units which are (sufficiently) spatially separated or at a distance from one another.

One particularly advantageous specific embodiment results when the distance and/or time period past the departure of the first illumination unit is measured. In the step of grouping, the first and second illumination units cannot be grouped into the group of two adjacent illumination units when the distance after the departure of the first illumination unit is greater than a distance threshold value, and/or when the time since the departure of the first illumination unit is greater than a time threshold value, it not being necessary for the second illumination unit to have yet departed from the detection range of the sensor. In this way, the overall system may respond to the two illumination units, which cannot be combined into the group of the adjacent illumination units, even before the second illumination unit has disappeared from the detection range. For example, continuous roadway illumination may thus be recognized early, and the headlights may, for example, be turned down from high beam to low beam.

One specific embodiment of the present invention is also advantageous in which in the step of recognizing, a third illumination unit is recognized, in the step of grouping, the third illumination unit being grouped into the group of at least two adjacently situated illumination units when a further distance which the vehicle travels, starting from a departure of the first illumination unit from the detection range of the sensor up to a departure of the third illumination unit from the detection range of the sensor, has the predetermined relationship with respect to the distance threshold value. Alternatively or additionally, in the step of grouping, the third illumination unit may be grouped into the group of at least two adjacently situated illumination units when a time during which the vehicle travels, starting from a departure of the first illumination unit from the detection range of the sensor to a departure of the third illumination unit from the detection range of the sensor, has the predetermined relationship with respect to the time threshold value. Such a specific embodiment of the present invention offers the advantage that more than two illumination units may also be grouped into a (shared) group of illumination units when these illumination units are to be considered as very close to one another spatially or with regard to a travel time, starting from a departure of the first illumination unit from the detection range of the sensor. Thus, also in subsequent post-processing of more than two recognized illumination units which are spatially very close to one another, the two illumination units may be interpreted or assessed as a single illumination unit. Errors in evaluating the individual illumination units recognized by the sensor may be reduced in this way.

One specific embodiment of the present invention is also advantageous in which in the step of recognizing, a third illumination unit is recognized, in the step of grouping, the third illumination unit not being grouped into the group of at least two adjacently situated illumination units when a further distance which the vehicle travels, starting from a departure of the first illumination unit from the detection range of the sensor up to a departure of the third illumination unit from the detection range of the sensor, does not have the predetermined relationship with respect to the distance threshold value. Alternatively or additionally, in the step of grouping, it is possible for the third illumination unit to not be grouped into the group of at least two adjacently situated illumination units when a time during which the vehicle travels, starting from a departure of the first illumination unit from the detection range of the sensor up to a departure of the third illumination unit from the detection range of the sensor, does not have the predetermined relationship with respect to the time threshold value. Such a specific embodiment of the present invention likewise offers the advantage that a clear criterion exists concerning which illumination units are combined into a group, and which additional recognized illumination units may no longer be grouped into the mentioned group of illumination units. An improvement of the results in subsequent further processing of the recognized illumination units or the illumination units which are grouped into a group may likewise be achieved in this way.

One particularly advantageous specific embodiment of the present invention may be realized when a third illumination unit is recognized, but is not grouped into the group of at least two adjacent illumination units when the distance traveled after the departure of the first illumination unit is greater than a distance threshold value, and/or when the elapsed time since the departure of the first illumination unit is greater than a time threshold value, the third illumination unit continuing to be visible. As the result of not waiting until the departure of the third illumination unit, a quicker response may be made to the presence of multiple illumination units, so that, for example, the headlights may be turned down more quickly when there is continuous roadway illumination.

It is particularly advantageous when, according to another specific embodiment of the present invention, a method for recognizing continuous roadway illumination along a roadway to be traveled by the vehicle is provided which has the following steps:
  detecting at least one individual illumination unit and a group of at least two adjacently situated illumination units which has been ascertained by carrying out a method according to one of the above-described variants;
  assessing the group of at least two adjacently situated illumination units as one individual illumination unit; and
  recognizing the continuous roadway illumination using the individual illumination unit and the group of at least two adjacently situated illumination units which is assessed as an individual illumination unit.

Such a specific embodiment of the present invention offers the advantage that the likelihood of error in the processing of the illumination units recognized by the sensor may be significantly reduced when in particular illumination units which are situated spatially close to one another are assessed not as multiple separate illumination units, but, rather, as one single (possibly "large") illumination unit.

It is particularly advantageous when, according to another specific embodiment of the present invention, in the step of recognizing, the presence of continuous roadway illumination is recognized when the vehicle travels a predetermined travel distance and/or a predetermined travel time between a position of the group of at least two adjacently situated illumination units which is assessed as one individual illumination unit and a position of the individual illumination unit. Alternatively or additionally, in the step of recognizing, the presence of continuous roadway illumination may be recognized when the vehicle travels a predetermined travel distance and/or a predetermined travel time between a position of the individual illumination unit and a position of the group of at least two adjacently situated illumination units which is assessed as one individual illumination unit. Such a specific embodiment of the present invention offers the advantage that taking into account the group of multiple illumination units as well as a separate illumination unit allows a significantly lower likelihood of error in establishing the presence of continuous roadway illumination than would be possible with a separate consideration of each individual illumination unit.

One specific embodiment of the present invention is particularly advantageous in which a method for controlling a light emission of at least one headlight of the vehicle is provided, the method having the following steps:
  recognizing the continuous roadway illumination according to one of the above-described variants; and
  changing the light emission of the at least one headlight of the vehicle in response to the presence of an ascertained group of at least two adjacently situated illumination units, in particular the changing of the light emission of the at least one headlight of the vehicle taking place at a point in time in which there is a predetermined relationship with respect to a point in time of an ascertained appearance of the group of at least two adjacently situated illumination units.

Such a specific embodiment of the present invention offers the advantage that a lower likelihood of error in deducing the presence of continuous roadway illumination based on recognized illumination units, and therefore a more (temporally and spatially) exact switchover of the light emission to the surroundings to be actually traveled by the vehicle, is thus possible.

DETAILED DESCRIPTION

In the following description of preferred exemplary embodiments of the present invention, identical or similar reference numerals are used for the elements having a similar action which are illustrated in the various figures, and a repeated description of these elements is dispensed with.

City light recognition for recognizing travel through an illuminated area, as is usually the case due to illuminated roadways in urban areas, is disclosed in German Published Patent Appln. No. 10 2009 028 342. However, traffic light systems, crosswalks with multiple lights, and intersections with multiple lights are situated in locally narrowly confined areas; therefore, these areas may often also be referred to as not "continuously" illuminated. Differentiating between such traffic areas for an evaluation algorithm is usually very difficult, and at nighttime there are numerous "false positives"; i.e., traveling through a "city" or an urban area having continuous roadway illumination is frequently recognized, although the actual traffic area ahead of the vehicle is merely a crosswalk, an intersection with multiple lights, or a traffic light system.

When, upon recognition of the streetlight in the case of a crosswalk/intersection with multiple lights, each light is recognized early as one independent streetlight, the long detection period for multiple streetlights may erroneously result in a recognition of continuous roadway illumination. The built-in security against prematurely switching over the light emission of the headlights of the vehicle into the "city mode" by evaluating the vertical position in the image (detection angle) is usually of no use in the present case, since the vehicle also travels beneath the illumination even when there are crosswalks, intersections with multiple lights, or traffic light areas, as the result of which the vertical position of the streetlight is sufficiently high.

The streetlights may thus be classified as such, for example, when self-illuminating stationary objects having a certain height are involved. However, for this reason traffic lights are often also classified as streetlights. An improvement on the part of a measurement or evaluation program, i.e., for the classification of streetlights, hardly appears possible. However, with a moderate level of effort it is possible on the part of the city recognition to significantly reduce the false positives for an incorrectly classified traffic light system as well as for crosswalks and intersections with multiple lights.

Figure 1:
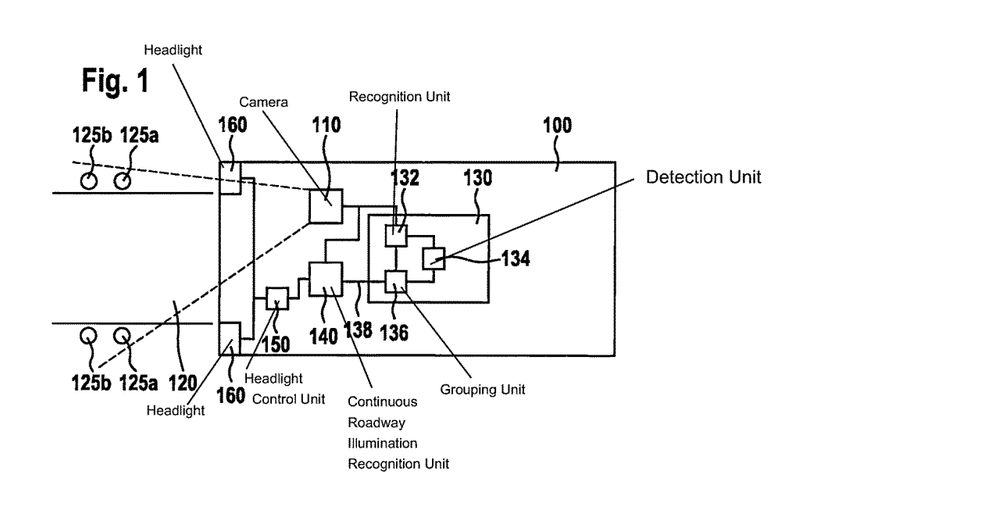
FIG. 1 shows a block diagram of a vehicle in which one exemplary embodiment of the present invention is used.

FIG. 1 shows a block diagram of a vehicle in which one exemplary embodiment of the present invention is used. FIG. 1 shows a vehicle 100 which contains a camera 110 as a sensor, in particular an optical sensor. Camera 110 detects objects which are present in a detection range 120 of the camera or which move in this detection range 120, for example when vehicle 100 moves. Camera 110 may recognize illumination units 125a and 125b in detection range 120, which are formed, for example, by streetlights, the lights of a traffic light system, or the like. In addition, vehicle 100 includes an evaluation unit 130 which has multiple subunits and which is connected to camera 110. In particular, evaluation unit 130 includes a recognition unit 132 for evaluating an image supplied by camera 110, this recognition unit 132 being designed to recognize at least one first illumination unit 125a and at least one second illumination unit 125b from the image of camera 110 in the detection range of the sensor, and to subsequently recognize a departure of first illumination unit 125a from detection range 120 of camera 110. In addition, evaluation unit 130 includes a detection unit 134 which is designed to detect a distance and/or a time until second illumination unit 125b departs from detection range 120 of the sensor or of camera 110 in response to a departure of first illumination unit 125a from the detection range of camera 110 which is recognized by recognition unit 132. Detection unit 134 may, for example, be connected to a further sensor system of vehicle 100 in order to recognize the distance traveled by vehicle 100 by detecting the rotational speed or the rotational angle of wheels of vehicle 100. Lastly, evaluation unit 130 also includes a grouping unit 136 which is connected to recognition unit 132 and to detection unit 134, and grouping unit 136 is designed to group first illumination unit 125a and second illumination unit 125b into the group of at least two adjacently situated illumination units when the distance has a predetermined relationship with respect to a distance threshold value, and/or when the time has a predetermined relationship with respect to a time threshold value. It is also conceivable that when the vehicle has traveled long enough, i.e., longer than the threshold, after departure of the first illumination unit, the second illumination unit does not necessarily have to depart from the detection range in order for the two illumination units to not be grouped together.

Thus, as a result of evaluation unit 130, a piece of information is output which represents a group 138 of at least two adjacently situated illumination units 125a, 125b, this group 138 including at least first illumination unit 125a and second illumination unit 125b. In addition, vehicle 100 includes a unit 140 for recognizing continuous roadway illumination, this unit 140 being connected to camera 110 and to evaluation unit 130 for recognizing the continuous roadway illumination. Unit 140 for recognizing the continuous roadway illumination is designed to extract from the image supplied by camera 110 objects in detection range 120 of camera 110 which correspond to illumination units 125, and to evaluate these extracted illumination units 125 as well as the information about the illumination units which are grouped into a group 138, and thus recognize continuous roadway illumination, which is usually present in an urban area. In addition, vehicle 100 includes a headlight control unit 150 which is connected to unit 140 for recognizing the continuous roadway illumination and which is designed to control an emission of light by headlights 160 of vehicle 100, using information that at that moment vehicle 100 is traveling in surroundings in which continuous roadway illumination is present. For example, this control of the emission of light by headlights 160 of vehicle 100 may be carried out in such a way that when the vehicle is traveling through an area having recognized continuous roadway illumination, the light from headlights 160 is not emitted in a high beam mode, since sufficient light is available for illuminating the roadway ahead of the vehicle due to the recognized continuous roadway illumination, and at the same time the vehicle drivers of oncoming vehicles are not blinded.

Figure 2:
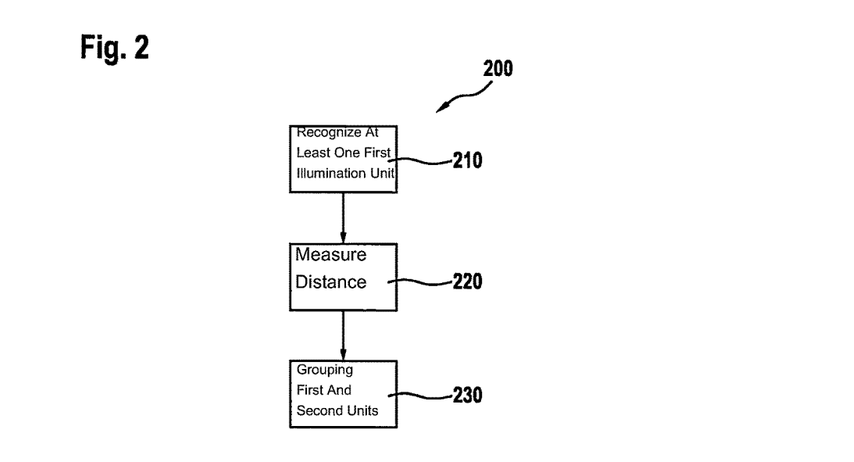
FIG. 2 shows a flow chart of one exemplary embodiment of the present invention as a method.

FIG. 2 shows a flow chart of one exemplary embodiment of the present invention as a method 200 for ascertaining a group of at least two adjacently situated illumination units during the travel of a vehicle. Method 200 includes a step of recognizing 210 at least one first illumination unit in a detection range of a sensor, and recognizing a subsequent departure of the first illumination unit from the detection range of the sensor. In addition, method 200 includes a step of beginning a measurement 220 of a distance which the vehicle travels after the first illumination unit departs from the detection range of the sensor, and/or beginning a measurement of a time during which the vehicle travels after the first illumination unit departs from the detection range of the sensor. Lastly, method 200 includes a step of grouping 230 the first illumination unit with a second illumination unit into the group of at least two adjacently situated illumination units when a measured distance up to a departure of the second illumination unit from the detection range of the sensor has a predetermined relationship with respect to a distance threshold value, and/or when a measured time up to a departure of the second illumination unit from the detection range of the sensor has a predetermined relationship with respect to a time threshold value, and/or not grouping the first illumination unit with a second illumination unit into the group of at least two adjacently situated illumination units when an instantaneously measured distance is greater than the distance threshold value and/or when an instantaneously measured time is greater than the time threshold value.

According to one exemplary embodiment of the present invention, streetlights or illumination units in general are thus combined as a type of "illumination cluster" (i.e., a group of multiple adjacently situated illumination units) when they are situated very close to one another. For this purpose, after the streetlight is recognized, it is awaited until the streetlight has disappeared from the image. All streetlights which disappear within a certain distance after the disappearance of the first streetlight from the image are combined into an illumination cluster. An illumination cluster is handled during a subsequent evaluation, for example for recognizing continuous roadway illumination such as one individual streetlight or illumination unit. It is thus possible for intersections and crosswalks with multiple lights as well as traffic light systems to not be erroneously regarded as "continuous" roadway illumination, but, rather, as one individual "streetlight" or illumination unit (i.e., one individual illumination cluster). The recognized streetlights do not disappear from the image at the same time when they are not situated at the exact same distance and do not have the same height. Therefore, a distance is selected (5-10 m, for example), within which streetlights which are disappearing from the image are included in an illumination cluster.

According to one or multiple different specific embodiments, the present invention may combine streetlights of intersections with multiple lights (double streetlight) and traffic light systems (different installation heights), as well as crosswalks with multiple lights, as an illumination group (i.e., as a group of illumination units). This combination is carried out, for example, according to the procedure explained in greater detail with reference to the figures described below.

Figure 3:
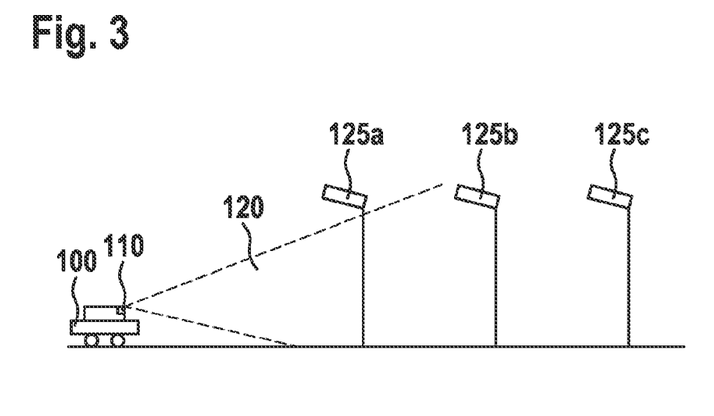
FIG. 3 shows a schematic illustration of one example of a scenario having a vehicle with a camera, a visual range of the camera, and multiple streetlights.

FIG. 3 shows a schematic illustration of a scenario having a vehicle 100 with a camera 110, visual range 120 of camera 110, and streetlights 125. FIG. 3 depicts a first streetlight (as the first illumination unit), a second streetlight 125b (as the second illumination unit), and a third streetlight 125c (as the third illumination unit) that are present in an area ahead of vehicle 100. When vehicle 100 now moves in the direction of illumination units 125, initially first illumination unit 125a, second illumination unit 125b, and possibly also third illumination unit 125c appear in detection range 120 of camera 110, and may be recognized as illumination units in an evaluation unit, not illustrated in FIG. 3. As the vehicle travels further, first illumination unit 125a, which is closest to vehicle 100, is the first to depart from detection range 120 of camera 110, whereas second illumination unit 125b (and possibly also third illumination unit 125c) is recognized as still being present in detection range 120 of camera 110.

Figure 4:
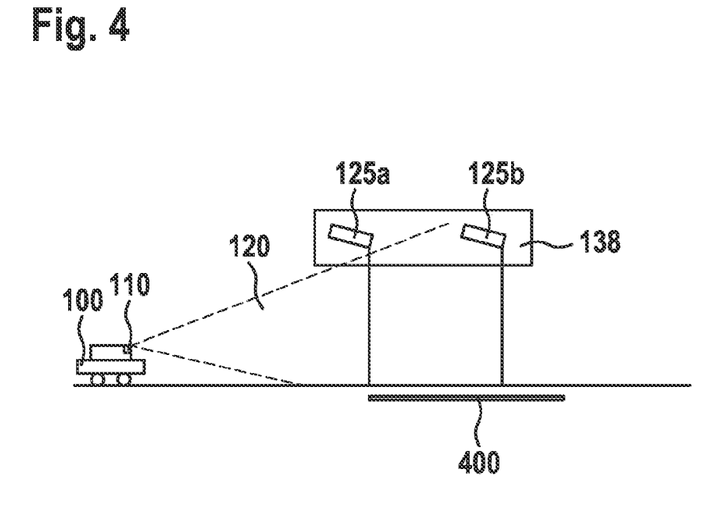
FIG. 4 shows another schematic illustration of one example of a scenario having the vehicle with a camera, the visual range of the camera, and streetlights, two streetlights having been combined into a group of illumination units in an evaluation unit.

After the departure of first illumination unit 125a (which in this case is closest to vehicle 100) is detected, a distance which vehicle 100 travels until second illumination unit 125b has also departed from detection range 120 of camera 110 of vehicle 100 is now detected. This is schematically illustrated in FIG. 4, the distance traveled by vehicle 100 until second illumination unit 125b has also departed from detection range 120 now being illustrated at the lower part of FIG. 4. If there is now a predetermined relationship of this detected distance with a distance threshold value 400 (which is represented by the length of the bar at the lower part of FIG. 4), for example, if the distance is less than distance threshold value 400, first illumination unit 125a and second illumination unit 125b are grouped or combined into a group 138 of at least two adjacently situated illumination units, as schematically indicated in FIG. 4. Namely, this detected distance may directly or indirectly provide an indication of the actual distance of first illumination unit 125a from second illumination unit 125b, since in a simple approximation it may be assumed that the distance which the vehicle travels between the departure of first illumination unit 125a until the departure of second illumination unit 125b, in each case from detection range 120 of camera 110, also corresponds to the distance of first illumination unit 125a from second illumination unit 125b. This distance threshold value 400 may thus be referred to as a type of "combining distance," i.e., as the distance threshold value for which all further illumination units subsequently situated within this distance threshold value after first illumination unit 125a are associated with group 138 of illumination units, i.e., are grouped into this group 138. In this way, first streetlight 125a and second 125b streetlight, for example, may be combined to form an "illumination cluster" when second illumination unit 125b is within a certain distance (i.e., in this case the combining distance, for example) of first streetlight 125a.

Alternatively or additionally, it is also possible to detect the time which elapses for the vehicle to travel from a recognized departure of first illumination unit 125a from detection range 120 of camera 110 until a recognized departure of second illumination unit 125b from detection range 120 of camera 110. This time may then be compared to a time threshold value, so that in this way as well, a distance of first illumination unit 125a from second illumination unit 125b may be deduced. However, it must be ensured that the time threshold value should advantageously be a function of the travel speed to allow a preferably detailed and precise ascertainment of the distance between the first illumination unit and the second illumination unit.

In subsequent further processing of the images of camera 110, for example for controlling the light emission by one or multiple headlights 160 of vehicle 100, as explained with reference to FIG. 1, this group 138 of adjacently situated illumination units may now be considered or assessed as one individual illumination unit 125. The situation may thus be avoided that a traffic area which represents an increased hazard potential (such as in the area of a crosswalk, a fairly large roadway intersection, or a traffic light system, for example) is interpreted as a roadway segment having continuous roadway illumination. Since for reasons of traffic safety these above-mentioned areas are usually more brightly illuminated than other roadway areas without a major hazard potential, by such a grouping of multiple illumination units it may also be ensured that the light emission by the headlights of the (host) vehicle is not changed in short intervals when one or more of the above-mentioned areas having an increased hazard potential is/are passed by vehicle 100. Namely, during the determination of continuous roadway illumination, if group 138 of at least two adjacently situated illumination units is assessed in the evaluation of the illumination units recognized in the image of camera 110 as one individual illumination unit, the likelihood of error for the recognition of continuous roadway illumination while traveling through the above-mentioned traffic areas having an increased hazard potential, for example, is greatly reduced.

Figure 5:
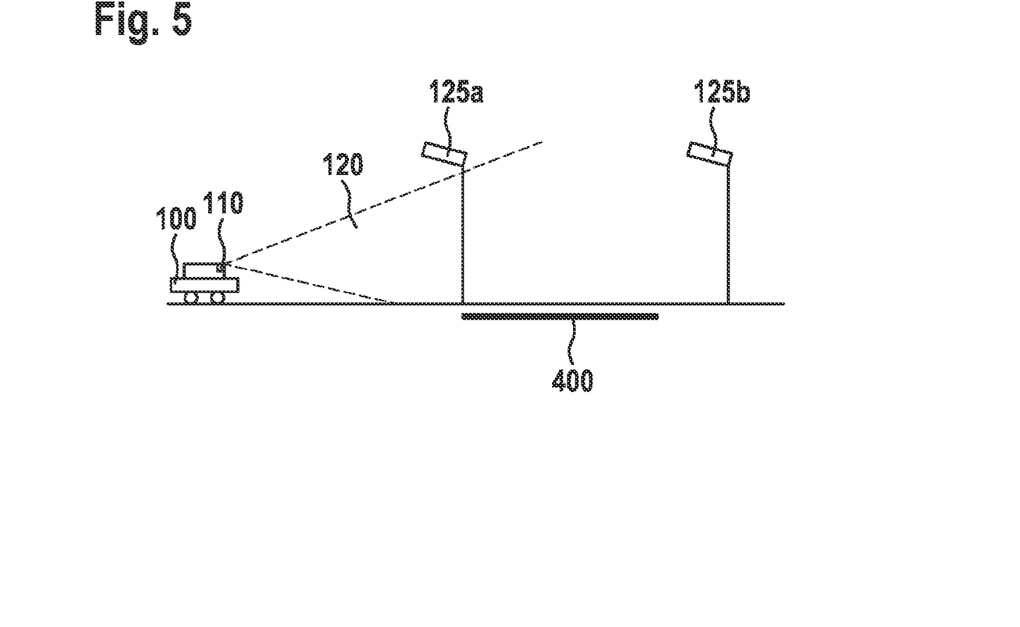
FIG. 5 shows another schematic illustration of one example of a scenario having the vehicle with the camera, the visual range of the camera, and streetlights, in which no combination of streetlights as a group of illumination units takes place in the evaluation unit of the vehicle.

FIG. 5 shows another schematic illustration of a scenario having a vehicle 100 with a camera 110, visual range 120 of camera 110, and streetlights 125, in which now, however, streetlights 125 are not combined as a group 138 of illumination units 125. The reason is that second illumination unit 125b is situated at a distance from first illumination unit 125a which is greater than distance threshold value 400. Thus, first illumination unit 125a and second 125b illumination unit are also not considered or assessed as one individual illumination unit in a subsequent evaluation of the image of camera 110. The evaluation of illumination units 125 recognized in detection range 120 of camera 110 requires no combination of the two streetlights for reducing the likelihood of error, since these streetlights are not within the combining distance; thus, a regular evaluation procedure for the image of camera 110 may be used.

Figure 6:
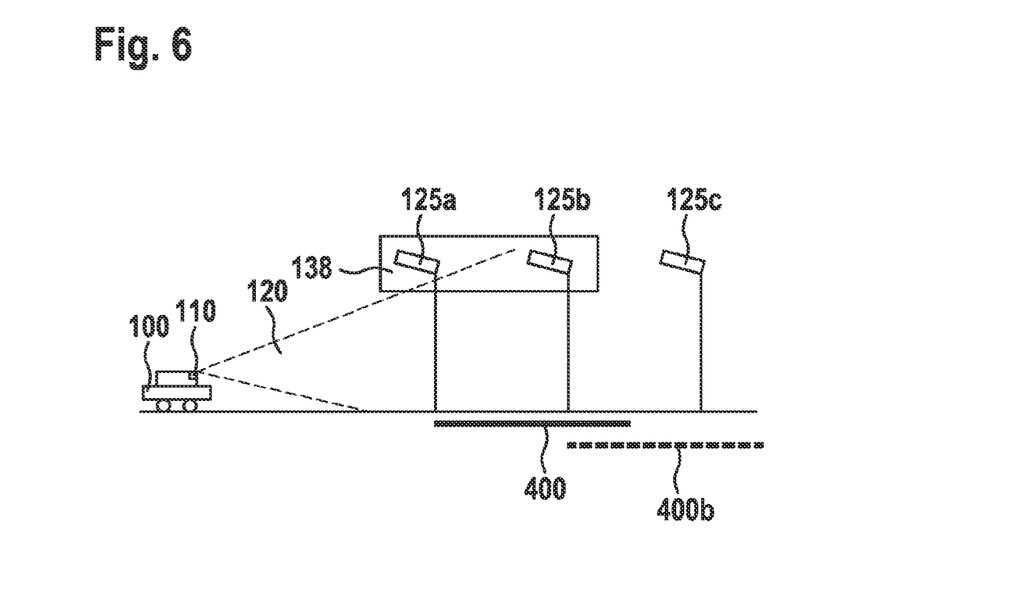
FIG. 6 shows another schematic illustration of one example of a scenario having the vehicle with the camera, the visual range of the camera, and streetlights, in which a combination of two streetlights as a group of illumination units takes place in an evaluation unit of the vehicle, but a third illumination unit has not been grouped into the group of illumination units.

FIG. 6 shows another schematic illustration of a scenario having a vehicle 100 with a camera 110, visual range 120 of the camera, and streetlights 125, in which two streetlights 125 are combined as a group 138 of illumination units, but a third illumination unit has not been grouped into a group of illumination units. Such a grouping rule is based on the assumption that only illumination units which are also situated within a predetermined distance from one another are to be combined. If third illumination unit 125c is now situated farther from first illumination unit 125a than the maximum value predefined by the distance threshold value, the third illumination unit should, or must, not be grouped into group 138 of the illumination units. Instead, the above-described procedure may be carried out anew after second illumination unit 125b departs from detection range 120 of camera 110, so that illumination units which are situated within a certain distance from one another are grouped into a shared group of illumination units. This may also result, for example, in an illumination unit (such as second illumination unit 125b in the illustration in FIG. 6) being grouped into two groups of illumination units, whereby the second group of illumination units, not illustrated in FIG. 6, may then include second illumination unit 125b and third illumination unit 125c (in the present case, a streetlight). As a result, the distance of second illumination unit 125b from third illumination unit 125c is less than, or at least not greater than, the distance threshold value (illustrated as a dashed line) which is now denoted by reference numeral 400b in FIG. 6, and which is determined starting from second illumination unit 125b in the direction of third illumination unit 125c. Thus, in FIG. 6, first streetlight 125a and second streetlight 125b have been combined into a shared group 138, since the first and second illumination units are within the (or a first) combining distance 400, whereas third illumination unit 125c is not grouped into group 138, since a combination of streetlights is carried out only for streetlights after the first streetlight which are situated at a maximum predetermined distance 400 from the first streetlight. Additional streetlights are then grouped into one or multiple other group(s).

Figure 7A:
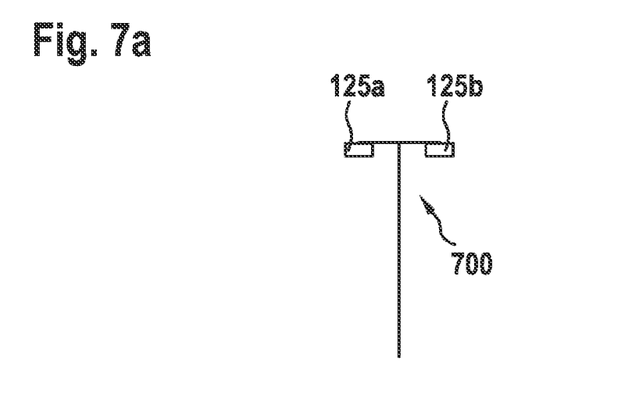
FIGS. 7a to 7c show illustrations of different illumination situations whose evaluation using the present invention provides better results than without the use of the present invention.

FIG. 7a shows an illustration of an illumination situation in which a traffic area is illuminated by a double streetlight 700. This double streetlight 700 would be recognized as two separate illumination units 125a and 125b by an evaluation algorithm during the recognition of illumination units, and also assessed as separate illumination units in the further signal processing. As a result, continuous roadway illumination could possibly be present during the recognition of a single lamp of such a double streetlight 700, which would represent an error. However, by using the approach proposed here, (due to the different viewing angles of the camera on the individual lamps of double streetlight 700), one of these lamps will disappear earlier from the visual field of the camera, and shortly thereafter the second of the lamps will disappear from the visual field of the camera. Thus, according to the above-described approach, the individual lamps of double streetlight 700 are grouped as a group of illumination units, and are assessed as one individual illumination unit in a subsequent evaluation of the image of the camera. This reduces the likelihood of error in the subsequent signal processing of the image of the camera. The approach may also be used when the two lamps disappear at the same time, since the distance (distance and/or time) between two lamps may then be assumed to be less than the threshold value (distance and/or time).

Figure 7B:
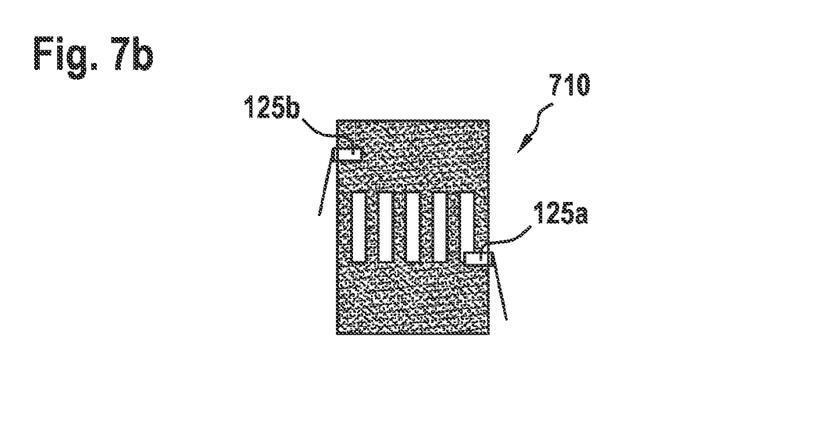

FIG. 7b illustrates a scenario of a traffic area in the region of a crosswalk 710 (here in the form of a zebra crossing). For better recognition of pedestrians using crosswalk 710, brighter illumination is usually used in the area of such a crosswalk 710 by situating multiple illumination units 125a and 125b close to one another. This may once again result in errors in recognizing streetlights situated this close to one another, which results in errors in recognizing continuous roadway illumination. When the above-described approach is now used, here as well the two illumination units may be combined into a group of illumination units, which is then used as one individual illumination unit in the evaluation of the image of the camera.

Figure 7C:
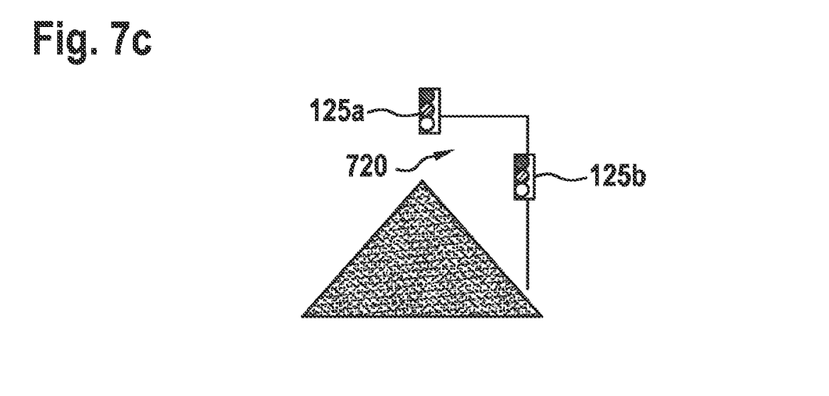

FIG. 7c shows a traffic light system 720 having multiple light signals 125a and 125b at different heights and distances from the edge of the roadway. Here as well, recognizing individual lights 125a and 125b of traffic light system 720 would result in an error in the recognition of continuous roadway illumination, since the lights of the traffic light system, which are situated very close to one another, would erroneously lead to the deduction of continuous roadway illumination. However, if the lights of traffic light system 720 are grouped into a group, and this group of illumination units is interpreted as one individual illumination unit, for example during the recognition of continuous roadway illumination, a significant reduction in the likelihood of error in the subsequent image evaluation may also be achieved in such a case.

The examples illustrated in FIG. 7 thus represent critical evaluation situations which may be addressed in an improved manner using the present invention, FIG. 7a illustrating a double light at intersections, for example, FIG. 7b illustrating a crosswalk having multiple streetlights at different distances, and FIG. 7c illustrating a traffic light system having signals at different heights, the traffic light mostly being recognized as a streetlight or streetlights.

A disadvantage of the present invention is that the recognition of continuous roadway illumination no longer takes place anticipatorily, and instead a more reactive response is made. The false positive rate, which has a great influence on the satisfaction of the (end) customer, may be significantly improved by the present invention.

Upon traveling out of an illuminated area, in which an immediate response to an appearance of a streetlight is to be made in order to not turn up the headlights within an illuminated area, combining is not recommended due to the increased time for response to an illumination cluster.

The streetlights which are combined within a certain distance after the disappearance of the first streetlight preferably do not reset the distance counting. It is thus also possible to separate closely spaced streetlights of continuous roadway illumination as at least two illumination clusters, and to thus carry out the city recognition.

If, after combining streetlights into an illumination cluster (i.e., the group of illumination units), still additional streetlights are present in the image but the combining distance has already been covered, a switchover into the area of continuous roadway illumination should be made more quickly, since multiple streetlights are already situated behind the vehicle.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment.

Furthermore, method steps according to the present invention may be repeated, and carried out in a sequence different from that described.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A processor-based method for ascertaining a group of at least two adjacently situated illumination units during a travel of a vehicle, the method comprising:
   recognizing at least one first illumination unit in a detection range of a sensor and recognizing a subsequent departure of the first illumination unit from the detection range of the sensor;
   performing at least one of:
      beginning a measurement of a distance which the vehicle travels after the departure of the first illumination unit from the detection range of the sensor, and
      beginning a measurement of a time during which the vehicle travels after the departure of the first illumination unit from the detection range of the sensor;
   performing at least one of:
      grouping the first illumination unit with a second illumination unit into the group of at least two adjacently situated illumination units when at least one of:
         the measured distance up to a departure of the second illumination unit from the detection range of the sensor has a predetermined relationship with respect to a distance threshold value, and
         the measured time up to the departure of the second illumination unit from the detection range of the sensor has a predetermined relationship with respect to a time threshold value, and
      not grouping the first illumination unit with the second illumination unit into the group of at least two adjacently situated illumination units when at least one of:
         an instantaneously measured distance is greater than the distance threshold value, and
         an instantaneously measured time is greater than the time threshold value;
   assessing the group of the at least two adjacently situated illumination units as one individual illumination unit;
   recognizing whether a condition of continuous roadway illumination exists on the basis of at least the group of the at least two adjacently situated illumination units assessed as one individual illumination unit, in order to control a light emission of a headlight of the vehicle.

2. The method as recited in claim 1, wherein at least one of:
   in the step of grouping, the first illumination unit and the second illumination unit are grouped into the group of at least two adjacently situated illumination units when the distance is less than the distance threshold value, and
   in the step of grouping, the first illumination unit and the second illumination unit are grouped into the group of at least two adjacently situated illumination units when the time is less than the time threshold value.

3. The method as recited in claim 1, wherein at least one of:
   in the step of not grouping, the first illumination unit and the second illumination unit are not grouped into the group of at least two adjacently situated illumination units when the distance is greater than the distance threshold value, and
   in the step of not grouping, the first illumination unit and the second illumination unit are not grouped into the group of at least two adjacently situated illumination units when the time is greater than the time threshold value.

4. The method as recited in claim 1, wherein:
   in the step of recognizing, at least one third illumination unit is recognized, and
   at least one of:
      in the step of grouping, the third illumination unit is grouped into the group of at least two adjacently situated illumination units when a further distance which the vehicle travels, starting from the departure of the first illumination unit from the detection range of the sensor up to a departure of the third illumination unit from the detection range of the sensor, has the predetermined relationship with respect to the distance threshold value, and
      in the step of grouping, the third illumination unit is grouped into the group of at least two adjacently situated illumination units when a time during which the vehicle travels, starting from the departure of the first illumination unit from the detection range of the sensor up to the departure of the third illumination unit from the detection range of the sensor, has the predetermined relationship with respect to the time threshold value.

5. The method as recited in claim 1, wherein:
   in the step of recognizing, a third illumination unit is recognized,
   at least one of:
      in the step of not grouping, the third illumination unit is not grouped into the group of at least two adjacently situated illumination units when a further distance which the vehicle travels, starting from the departure of the first illumination unit from the detection range of the sensor, does not have the predetermined relationship with respect to the distance threshold value, and
      in the step of grouping, the third illumination unit is not grouped into the group of at least two adjacently situated illumination units when a time during which the vehicle travels, starting from the departure of the first illumination unit from the detection range of the sensor, does not have the predetermined relationship with respect to the time threshold value.

6. A processor-based method for recognizing a continuous roadway illumination along a roadway to be traveled by the vehicle, comprising:
reading in at least one individual illumination unit and a group of at least two adjacently situated illumination units which has been ascertained by:
recognizing at least one first illumination unit in a detection range of a sensor and recognizing a subsequent departure of the first illumination unit from the detection range of the sensor;
performing at least one of:
beginning a measurement of a distance which the vehicle travels after the departure of the first illumination unit from the detection range of the sensor, and
beginning a measurement of a time during which the vehicle travels after the departure of the first illumination unit from the detection range of the sensor; and
performing at least one of:
grouping the first illumination unit with a second illumination unit into the group of at least two adjacently situated illumination units when at least one of:
the measured distance up to a departure of the second illumination unit from the detection range of the sensor has a predetermined relationship with respect to a distance threshold value, and
the measured time up to the departure of the second illumination unit from the detection range of the sensor has a predetermined relationship with respect to a time threshold value, and
not grouping the first illumination unit with the second illumination unit into the group of at least two adjacently situated illumination units when at least one of:
an instantaneously measured distance is greater than the distance threshold value, and
an instantaneously measured time is greater than the time threshold value;
assessing the group of at least two adjacently situated illumination units as one individual illumination unit; and
recognizing the continuous roadway illumination using the individual illumination unit and the group of at least two adjacently situated illumination units which is assessed as one individual illumination unit, in order to control a light emission of a headlight of the vehicle.

7. The method as recited in claim 6, wherein at least one of:
in the step of recognizing, a presence of the continuous roadway illumination is recognized when the vehicle travels at least one of a predetermined travel distance and a predetermined travel time between a position of the group of at least two adjacently situated illumination units which is assessed as one individual illumination unit and a position of the individual illumination unit, and
in the step of recognizing, the presence of the continuous roadway illumination is recognized when the vehicle travels at least one of the predetermined travel distance and the predetermined travel time between a position of the individual illumination unit and the position of the group of at least two adjacently situated illumination units which is assessed as one individual illumination unit.

8. A processor-based method for controlling a light emission of at least one headlight of the vehicle, comprising:
recognizing the continuous roadway illumination by:
reading in at least one individual illumination unit and a group of at least two adjacently situated illumination units which has been ascertained by:
recognizing at least one first illumination unit in a detection range of a sensor and recognizing a subsequent departure of the first illumination unit from the detection range of the sensor;
performing at least one of:
beginning a measurement of a distance which the vehicle travels after the departure of the first illumination unit from the detection range of the sensor, and
beginning a measurement of a time during which the vehicle travels after the departure of the first illumination unit from the detection range of the sensor; and
performing at least one of:
grouping the first illumination unit with a second illumination unit into the group of at least two adjacently situated illumination units when at least one of:
the measured distance up to a departure of the second illumination unit from the detection range of the sensor has a predetermined relationship with respect to a distance threshold value, and
the measured time up to the departure of the second illumination unit from the detection range of the sensor has a predetermined relationship with respect to a time threshold value, and
not grouping the first illumination unit with the second illumination unit into the group of at least two adjacently situated illumination units when at least one of:
an instantaneously measured distance is greater than the distance threshold value, and
an instantaneously measured time is greater than the time threshold value;
assessing the group of at least two adjacently situated illumination units as one individual illumination unit; and
recognizing the continuous roadway illumination using the individual illumination unit and the group of at least two adjacently situated illumination units which is assessed as one individual illumination unit; and
changing the light emission of the at least one headlight of the vehicle in response to a presence of the group of at least two adjacently situated illumination units assessed as one individual illumination unit.

9. The method as recited in claim 8, wherein the changing of the light emission of the at least one headlight of the vehicle takes place at a point in time in which there is a predetermined relationship with respect to a point in time of an ascertained appearance of the group of at least two adjacently situated illumination units.

10. A device having units for ascertaining a group of at least two adjacently situated illumination units during a travel of a vehicle, the device including a processor comprising:

an arrangement for recognizing at least one first illumination unit in a detection range of a sensor and recognizing a subsequent departure of the first illumination unit from the detection range of the sensor;

an arrangement for performing at least one of:
- beginning a measurement of a distance which the vehicle travels after the departure of the first illumination unit from the detection range of the sensor, and
- beginning a measurement of a time during which the vehicle travels after the departure of the first illumination unit from the detection range of the sensor; and an arrangement for performing at least one of:
- grouping the first illumination unit with a second illumination unit into the group of at least two adjacently situated illumination units when at least one of:
  - the measured distance up to a departure of the second illumination unit from the detection range of the sensor has a predetermined relationship with respect to a distance threshold value, and
  - the measured time up to the departure of the second illumination unit from the detection range of the sensor has a predetermined relationship with respect to a time threshold value, and
- not grouping the first illumination unit with the second illumination unit into the group of at least two adjacently situated illumination units when at least one of:
  - an instantaneously measured distance is greater than the distance threshold value, and
  - an instantaneously measured time is greater than the time threshold value;

an arrangement for assessing the group of the at least two adjacently situated illumination units as one individual illumination unit;

an arrangement for recognizing whether a condition of continuous roadway illumination exists on the basis of at least the group of the at least two adjacently situated illumination units assessed as one individual illumination unit, in order to control a light emission of a headlight of the vehicle.

11. A non-transitory computer program product having a program code for carrying out, when the program code is executed on a device, a processor-based method for ascertaining a group of at least two adjacently situated illumination units during a travel of a vehicle, the method comprising:

recognizing at least one first illumination unit in a detection range of a sensor and recognizing a subsequent departure of the first illumination unit from the detection range of the sensor;

performing at least one of:
- beginning a measurement of a distance which the vehicle travels after the departure of the first illumination unit from the detection range of the sensor, and
- beginning a measurement of a time during which the vehicle travels after the departure of the first illumination unit from the detection range of the sensor; and performing at least one of:
- grouping the first illumination unit with a second illumination unit into the group of at least two adjacently situated illumination units when at least one of:
  - the measured distance up to a departure of the second illumination unit from the detection range of the sensor has a predetermined relationship with respect to a distance threshold value, and
  - the measured time up to the departure of the second illumination unit from the detection range of the sensor has a predetermined relationship with respect to a time threshold value, and
- not grouping the first illumination unit with the second illumination unit into the group of at least two adjacently situated illumination units when at least one of:
  - an instantaneously measured distance is greater than the distance threshold value, and
  - an instantaneously measured time is greater than the time threshold value, assessing the group of the at least two adjacently situated illumination units as one individual illumination unit;

recognizing whether a condition of continuous roadway illumination exists on the basis of at least the group of the at least two adjacently situated illumination units assessed as one individual illumination unit, in order to control a light emission of a headlight of the vehicle.

* * * * *